June 22, 1954  E. L. BARCUS  2,681,956
DIRECTION SIGNALING DEVICE
Filed Dec. 7, 1949  2 Sheets-Sheet 1

Inventor
Edward L Barcus
By
Willits, Helwig & Baillio
Attorneys

June 22, 1954          E. L. BARCUS                2,681,956
              DIRECTION SIGNALING DEVICE
Filed Dec. 7, 1949                            2 Sheets-Sheet 2
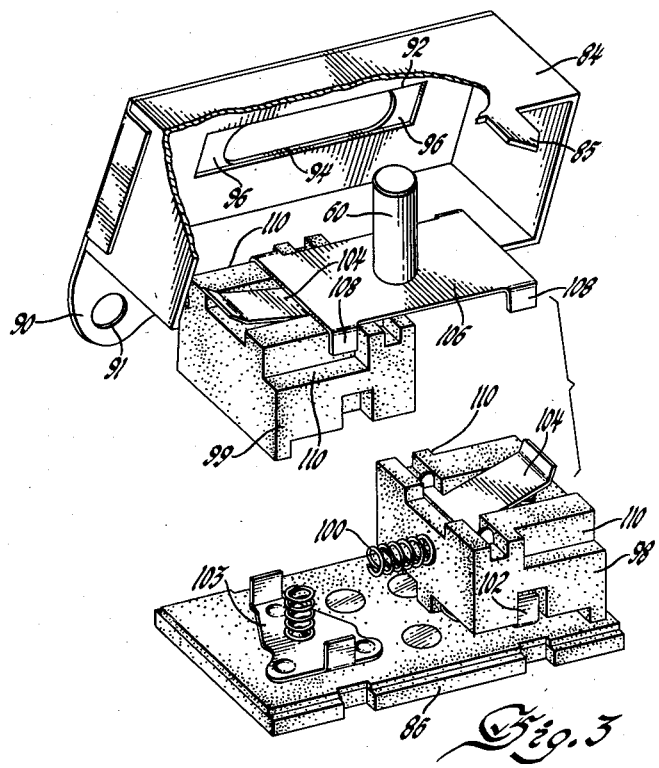
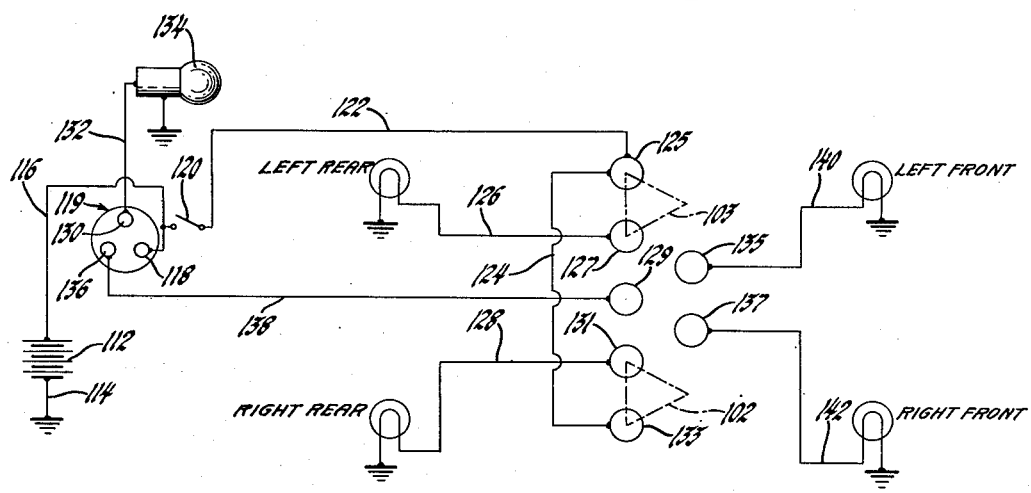
Fig. 3
Fig. 4
Inventor
Edward L. Barcus
By
Willits, Helmig & Baillio
Attorneys Patented June 22, 1954

2,681,956

UNITED STATES PATENT OFFICE 2,681,956

DIRECTION SIGNALING DEVICE

Edward L. Barcus, Anderson, Ind., assignor to General Motors Corporation, Detroit, Mich., a corporation of Delaware Application December 7, 1949, Serial No. 131,606

4 Claims. (Cl. 200—61.3)

The present invention relates to direction signaling devices for automotive vehicles and more particularly to signaling devices of the type disclosed in the U. S. Patent No. 2,596,440 Sampson, assigned to the assignee of the present invention.

The object of the invention is to provide an improved signaling device adapted to be manually set to energize a signaling circuit and automatically reset to a neutral position by operation of the steering mechanism after the steering mechanism has been returned to a substantially straight directional path for the vehicle.

This and other objects are attained in accordance with the present invention by providing a signaling device including an electrical switch having means adapted upon manual operation of the device to lock the switch in a circuit energizing position and unlock the switch for return to a neutral position in response to a rotary movement of the steering wheel.

Figure 1:
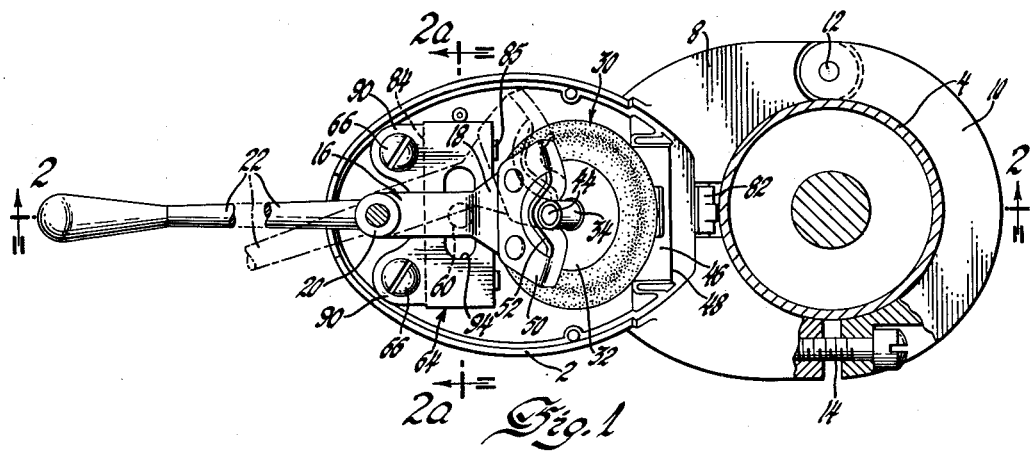
Figure 2:
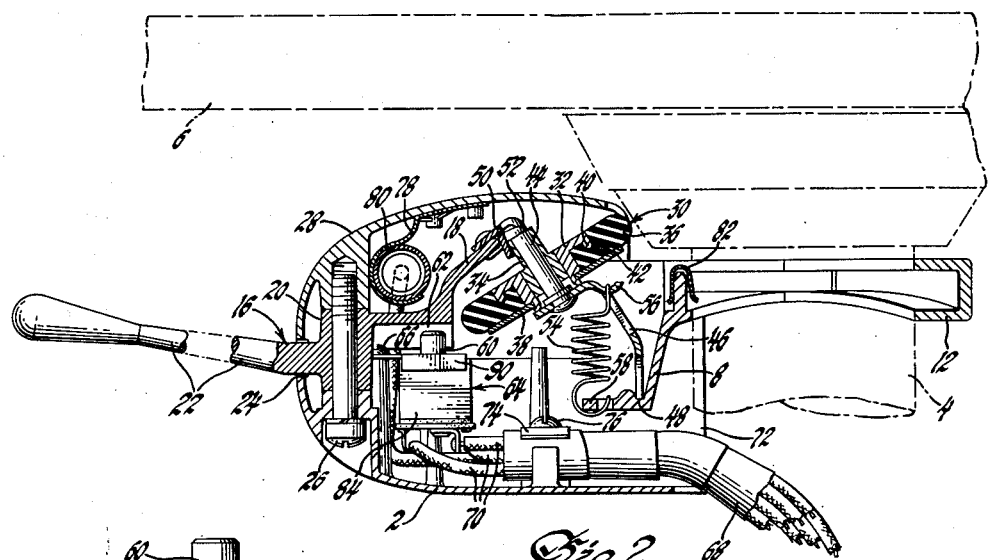
Figure 2A:
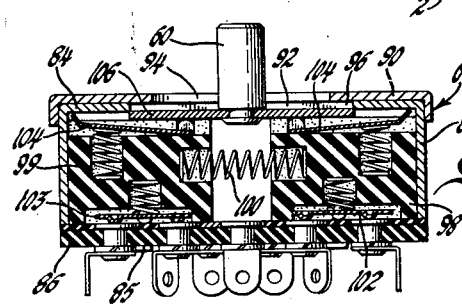

For a better understanding of the invention reference may be had to the accompanying drawings in which Figure 1 is a plan view of the signaling device mounted on the steering column of a vehicle with the cover removed; Figure 2 is an elevational view in cross section of the device mounted on the steering column adjacent the steering wheel of a vehicle; Figure 2a is a longitudinal sectional view of the switch taken along line 2a—2a of Fig. 1; Figure 3 is an exploded perspective view of the electrical switch of the device and Figure 4 is a diagrammatic view of the signaling system.

Referring now to the drawings and particularly to Figures 1 and 2 there is illustrated a signaling device embodying the present invention in which the operating mechanism is enclosed in a housing 2 adapted to be attached to the steering column 4 adjacent the steering wheel 6 of an automotive vehicle. The housing 2 is formed with an integral split ring clamp consisting of the yoke member 8 to which there is attached a cooperating clamping arm 10 hinged at 12. This form of housing is readily attachable to the steering column 4 of a vehicle by swinging the arm 10 outwardly, placing the yoke in engagement with the surface of the steering column and thereafter clamping the housing to the steering column with a threaded member 14, as shown. Positioned within the housing is a die cast operating member 16 comprising a cam segment 18, a hub 20 and an operating lever 22 which extends outwardly of the housing through an opening 24. The operating lever 16 is rotatably mounted on a partly threaded member 26 which also serves to secure a housing cap 28 to the housing as shown.

To effect automatic return of the operating member 16 to its neutral position from either of its operating positions, a friction roller 30 is provided in the housing. The roller comprises a hub 32 mounted on a bushing journal 34 which extends outwardly of the hub. Mounted on the hub 32 is an annular ring 36 of suitable resilient material such, for example, as rubber or the like. The rubber ring is secured on the hub by a washer 38 which is attached to the hub by spreading a portion of the hub over the washer, as shown. To effect suitable frictional engagement between the hub 32 and ring 36 to prevent slippage therebetween, the hub 32 is provided with an inwardly extending axial flange 40 which seats in a cooperating annular recess 42 in the rubber ring.

The friction roller 30 is mounted for rotation on a pin 44 extending upwardly from a pivot plate 46 having its lower end recessed in a slot 48 formed in the housing 2. As shown, the roller 30 is positioned so that the upper end of the bushing journal 34 engages a camming plate 50 secured to the cam segment 18 by any suitable means, as for example rivets. The camming plate 50 may be formed of a metal adapted to be heat treated to provide a hard wearing surface for engaging the bushing journal and is provided with a camming recess 52. The outwardly extending portion of the bushing journal 34 is yieldingly urged into engagement with the camming plate 50 by a spring 54 which has one end connected to an ear 56 pressed outwardly from the pivot plate and the other end connected to a flange 58 extending inwardly from the housing 2.

Positioned within the housing 2 with its operating arm 60 recessed in a slot 62 formed in the operating member 16 is an electrical switch 64 such as that disclosed in my application Serial No. 123,036, filed October 22, 1949, and assigned to the assignee of the present application. The switch 64 is secured in the housing 2 by threaded members 66 and is of a snap acting type which cooperates with the mechanism to impart desirable characteristics to the operation of the direction signal system. An electrical cable 68 having terminal leads 70 for connection to the switch 64 is brought into the housing through an aperture 72 and clamped by a clamping member 74 secured to the housing by a threaded member 76.

To provide a visual indication of the operating condition of the system a pilot lamp is secured in the housing cap 28 by a metal clip 78 attached to the inner surface of the cap by any suitable means. The clip 78 is adapted to secure a bulb socket 80 in a position under an aperture covered with a colored window, not shown. The colored window is adapted to transmit light from the enclosed lamp bulb to the eye of the operator.

To provide a suitable ground connection between the housing and the steering column, a spring clip 82 is provided. The clip 82 slips over the edge of the housing 2 firmly engaging the edge and has outturned edges which bite through the paint covering on the steering column and into the metal for an electrical ground contact.

The switch 64 is illustrated in more detail in Figures 2a and 3 and comprises a housing 84 enclosed by a terminal plate 86 secured thereto by ears 85. The terminal plate carries a plurality of spaced contact terminals. Secured to the housing 84 is a bracket member 90 provided with apertures 91 for securing a switch in the housing member 2. As shown, the housing 84 has a rectangular opening 92 and the bracket member 90 has an oblong opening 94 coinciding therewith but of substantially less length. When the bracket member 90 is secured to the housing 84 there are formed recessed ledges 96 adjacent the opening 94.

Slidably mounted within the housing 84 are a pair of blocks 98 and 99 of insulating material which are yieldingly urged by a spring 100 to extreme positions in the housing. Triangularly shaped contact bridging members 102 and 103 are carried respectively by the underside of blocks 98 and 99 and yieldingly urged into engagement with the contact terminals. Ratchet arms 104 are carried by the upper side of the blocks 98 and the ends of the arms are likewise yieldingly urged into engagement with the wall surface of housing 84 and in the operative position of the blocks 98 and 99 are urged into recesses 96 to hold the blocks in one of the operative signaling positions. A bridge 106 spans the two blocks 98 and 99 and has downturned ears 108 which are recessed in slots 110 in blocks 98 and 99. An operating arm 60 is attached to the bridge and extends through the aperture 94. In the operative position of the switch in the housing 2 the arm 60 extends into the recess 62 in the operating member 16.

To provide visual indication of the direction of turn contemplated by the operator of a vehicle the contact terminals of switch 64 are connected in a plurality of circuits of a signaling system including left and right front and rear signaling lamps. As illustrated in Figure 4 of the drawings the system comprises a battery 112 which has one terminal connected to ground through a conductor 114 and the other terminal connected through a conductor 116 to an input terminal 118 of a thermally controlled current interrupting device 119 commonly known as a flasher and used extensively in direction signal systems for vehicles. Such devices are adapted to intermittently make and break current carrying circuits in which the flasher forms a part of the circuit.

The battery 112 is also connected through conductor 116, switch 120, conductors 122 and 124 to the outer contact terminals 125 and 133 of the switch terminal plate 86. The contact terminals 127 and 131 immediately adjacent contact terminals 125 and 133 are connected respectively by conductors 126 and 128 and the filaments of the right and left rear signaling lamps to ground. One of the output terminals 130 of the flasher 119 is connected through conductor 132 and the filament of the pilot lamp 134 to ground. The other output terminal 136 of the flasher 119 is connected through conductor 138 to the contact terminal 129. The remaining contact terminals 135 and 137 of the switch 164 are connected respectively through conductors 140 and 142 and the filaments of the left and right front signaling lamps to ground.

In the operation of the signaling device hereinabove described a counterclockwise rotation of the operating member 16 to the dotted line position illustrated in Fig. 1 forces the bushing journal 34 out of the camming recess 52 against the pressure of spring 54 and into engagement with the adjacent surface of the camming plate 50. Simultaneously the peripheral edge of the roller 30 is forced into engagement with the hub of steering wheel 6 and the operating arm 60 of the switch 64 is moved causing the block 99 and contact bridging member 103 to shift in the switch housing 84 against the pressure of spring 100 to a position where the contact bridging member 103 bridges contact terminals 127, 129 and 135. Movement of block 99 to its contact bridging position causes the ratchet arm 104 carried thereby to engage its cooperating recessed ledge 96 and locks the block 99 and contact bridging member 103 in this position. In this position current is carried from the battery 112 through conductor 116, flasher 119, conductor 138, contact terminal 129, contact bridging member 103, terminals 127 and 135 and conductors 126 and 140 to the filaments of the left front and rear signaling lamps of the vehicle. With this circuit arrangement the operation of the flasher 119 causes an intermittent flashing of the left front and rear signaling lamps providing a visual indication of the operator's intention to make a left turn. At the same time with the block 98 and contact bridging member 102 of switch 64 remaining in its normal position of bridging contacts 131 and 133 an indication of an intention to stop may be conveyed rearwardly of the vehicle by application of the brake pedal which being linked to switch 120 causes its closure and energizing of a circuit from the battery 112 through conductor 116, switch 120, conductor 122, contact terminal 125, conductor 124, contact terminal 133, contact bridging member 102, contact terminal 131 and conductor 128 to the right rear lamp. As the circuit through the switch 120 bypasses the flasher the right rear lamp is energized with a steady flow of current. With the intermittent operation of the flasher in the circuit of the left front and rear signaling lamps the pilot lamp is likewise intermittently energized through the flasher conductor 132, and the filament of the lamp bulb 134 to ground. The intermittent operation of the pilot lamp provides a signal indication to the operator indicating that the circuits to the signaling lamps are complete and that the signaling lamps are operating to provide a signal.

With the rotation of the steering wheel 6 in a counterclockwise direction to make a left turn, the rotation of the wheel 6 causes a clockwise rotation of roller 30 and bushing journal 44 on the engaged surface of the camming plate 50. As the operating member 16 is in its extreme counterclockwise operating position, the clockwise rotation of roller 30 causes the bushing journal 34 to slip on the engaged cam face without imparting movement to the operating member. Upon reversal of the direction of the steering wheel 6 to straighten the path of the vehicle the direction of rotation of the roller is likewise reversed and the frictional engagement between the bushing journal 34 and cam plate 50 causes the operating member to be returned to its neutral position whereupon bushing journal 34 is forced into recess 52 disengaging the periphery of roller 30 from the hub of steering wheel 6. During the return movement of the operating member 16 it simultaneously causes the operating arm 60 of switch 64 to return to its neutral position. The operating arm 60 being attached to bridge 106 causes the bridge to slide over ratchet arm 104 carried by block 99 gradually depressing the end of the ratchet arm from engagement with its cooperating recessed ledge 96 until the end of the ratchet arm is cleared. The force of spring 100 thereafter causes the block 99 and bridging contact 103 to be returned to its extreme position in the housing with a snap action.

From the description of the operation of a left turn signal it will be obvious that to provide a right turn signal movement of the operating member 16 will be clockwise shifting block 98 and contact bridging member 102 of switch 64 to bridge contact terminals 129, 131 and 137 thereby providing a closed circuit from the battery to the filaments of the right front and rear indicating lamps causing intermittent operation of these lamps.

Operation of the brake pedal and simultaneous closure of switch 120 when the operating member is in its neutral position provides for continuous energization of the left and right rear lamps by forming a current carrying path from the battery 112 through conductor 116, switch 120, conductor 122 and conductor 124 to contact terminals 125 and 133, contact bridging members 102 and 103 contact terminals 127 and 131 and conductors 126 and 128 to the rear signaling lamps.

A signaling device such as hereinabove described is particularly desirable since the ratchet locking mechanism of the electrical switch permits rotation of the steering wheel through an arc of substantially 95° to return the vehicle to substantially a straight directional path before the right or left terminal signaling circuits are deenergized. The practical advantage of such a device is a signal indication throughout substantially the complete turn of the vehicle.

What I claim as new and desire to secure by Letters Patent of the United States is:

1. A direction signaling device comprising a housing, a plate pivotally mounted in said housing, a friction wheel mounted for rotation on said plate, said wheel having an axially extending portion secured thereto, an operating member rotatably mounted in said housing, said member having a cam segment for engaging said axially extending portion and shifting the position of said wheel in said housing, a spring engaging said plate in said housing to yieldingly urge said axially extending portion into engagement with said cam segment and a switch mounted in said housing with its operating arm engaging said operating member.

2. A direction signaling device comprising a housing, an operating member mounted for rotary movement in said housing, said operating member being provided with a cam segment, a switch mounted in said housing with its operating arm in engagement with said operating member, a plate mounted for pivotal movement in said housing, said plate having a pin extending therefrom, a friction wheel rotatably mounted on said pin, said wheel having an axially extending portion provided thereon for engaging said cam segment and a spring having its ends attached to said plate and said housing for yieldingly urging said axially extending portion into engagement with said cam segment.

3. A direction signaling device comprising a housing, an operating member mounted for rotary movement in said housing, said operating member being provided with a cam segment having a recessed portion therein, a pivot plate pivotally mounted in said housing, said pivot plate having a pin extending therefrom, a roller mounted for rotation on said pin, said roller comprising a hub, a journal bushing mounted in said hub and a ring of friction material mounted on said hub, said journal bushing having an axially extending portion, a spring attached between said pivot plate and said housing for yieldingly urging said axially extending portion into engagement with said cam segment and a switch mounted in said housing with its operating arm in engagement with said cam segment.

4. In an automotive vehicle having a rotatable steering wheel and a stationary support adjacent said wheel in combination, a turn signal device comprising a housing mounted on said support, a plate mounted for pivotal movement in said housing, a friction roller mounted for rotation on said plate, said roller having an axially extending portion secured thereto, an operating member rotatably mounted in said housing for moving said roller into engagement with said wheel, said operating member having a cam segment engaging said axially extending portion, said cam segment having a recess therein for receiving said axially extending portion to disengage said roller from said wheel, a spring engaging said plate and said housing and yieldingly urging said axially extending portion into engagement with said cam segment and a switch mounted in said housing with its operating arm engaging said operating member.

References Cited in the file of this patent

UNITED STATES PATENTS

| Number | Name | Date |
|---|---|---|
| 1,973,299 | Swartwout | Sept. 11, 1934 |
| 1,981,671 | Schmitt | Nov. 20, 1934 |
| 2,034,414 | Pagendarm | Mar. 17, 1936 |
| 2,040,923 | Doane | May 19, 1936 |
| 2,068,632 | Stites | Jan. 19, 1937 |
| 2,111,931 | Howard | Mar. 22, 1938 |
| 2,207,114 | Bruderick | July 9, 1940 |
| 2,308,108 | Roedding | Jan. 12, 1943 |

FOREIGN PATENTS

| Number | Country | Date |
|---|---|---|
| 84,370 | Sweden | Sept. 17, 1935 |